Patented Oct. 18, 1949

2,485,152

UNITED STATES PATENT OFFICE 2,485,152

ESTER OF NICOTINIC ACID

Max Hartmann, Riehen, and Emil Merz, Bottmingen, Switzerland, assignors to Ciba Pharmaceutical Products, Inc., Summit, N. J.

No Drawing. Application March 2, 1948, Serial No. 12,684. In Switzerland March 14, 1947

1 Claim. (Cl. 260—290.5)

The present invention relates to a new and therapeutically useful nicotinic acid ester.

More specifically, the invention relates particularly to the tetrahydrofurfuryl ester of nicotinic acid, which ester corresponds to the formula

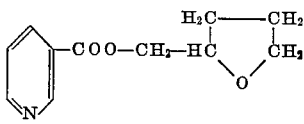

This compound is an oil which is lipoid-soluble as well as water-soluble. It possesses valuable therapeutic properties, being especially characterized by a counter-irritant (hyperaemia-producing) action on the skin.

The new nicotinic acid ester may be prepared by reacting nicotinic acid or a functional derivative thereof, for example its halide, anhydride, ester or nitrile, with tetrahydrofurfuryl alcohol or a reactive derivative thereof, for example a metal derivative. The reaction may be carried out in the presence of a solvent and/or a catalyst or condensing agent.

An alternative mode of procedure is to decarboxylate pyridine-3-carboxylic acid-tetrahydrofurfuryl-ester-2-carboxylic acid. The decarboxylation may be effected by the action of heat in the presence or absence of a solvent or catalyst. Pyridine-3-carboxylic acid-tetrahydrofurfuryl-ester-2-carboxylic acid may be prepared, for example, by reacting quinolinic acid anhydride with tetrahydrofurfuryl alcohol. In this connection the decarboxylation of the formed pyridine-3-carboxylic acid-tetrahydrofurfuryl-ester-2-carboxylic acid may be carried out without isolating the same.

It is intended to use the new compound therapeutically or as an intermediate for the preparation of therapeutics.

In the following illustrative, but not limitative, examples, the relationship between parts by weight and parts by volume is the same as that between the gram and the cubic centimeter.

Example 1

112 parts by weight of tetrahydrofurfuryl alcohol in 300 parts by volume of dry ether are added, with stirring, to a solution, cooled to 0° C., of 142 parts by weight of nicotinic acid chloride in 500 parts by volume of dry ether. Separation of the crystalline hydrochloride of the tetrahydrofurfuryl ester of nicotinic acid begins within half an hour. The reaction mass is allowed to stand at room temperature in order that the reaction may go to completion. The supernatant ether is then decanted and the solid residue dissolved in a minimum quantity of water. After treatment with a small amount of animal charcoal, the ester is liberated from the aqueous solution of the ester hydrochloride by the addition of saturated potassium carbonate solution and is separated in the form of an oil. This is taken up in ether and, after drying with calcined sodium sulfate and distillation of the solvent, is fractionated in vacuo. There is thus obtained the tetrahydrofurfuryl ester of nicotinic acid of boiling point 114–116° C. (0.25 mm.). The product is an oil of water-like transparency, which is soluble in all proportions in organic solvents, such for example as ether, alcohol and benzene, and also in water. From the latter, it is precipitated upon heating but re-dissolves upon cooling.

Instead of nicotinic acid chloride, use may be made of nicotinic acid anhydride or of nicotinic acid itself. In the latter case, hydrochloric acid gas, for example, is passed into the reaction mixture. The tetrahydrofurfuryl alcohol may be replaced by, for example, sodium tetrahydrofurfuryl alcoholate.

Example 2

450 parts by weight of quinolinic acid anhydride and 306 parts by weight of tetrahydrofurfuryl alcohol are heated together to 100° C. for 3 to 4 hours, and are then kept at 150–160° C. as long as there is an evolution of carbon dioxide. To accelerate the gas development, a small quantity of copper powder may be added. Upon termination of the decarboxylation and cooling of the reaction mass, the latter is dissolved in an equal volume of water and double the volume of saturated potassium carbonate solution is added to the resultant solution, after insoluble resinified particles have been removed by filtration. The product is then extracted with ether, dried with calcined sodium sulfate, the ether distilled off, and the obtained tetrahydrofurfuryl ester of nicotininc acid purified by fractional distillation in vacuo; boiling point is 113–116° C. (0.25 mm.). The yield is 87% of the theoretical.

Having thus disclosed the invention, what is claimed is:

The tetrahydrofurfuryl ester of nicotinic acid of the formula

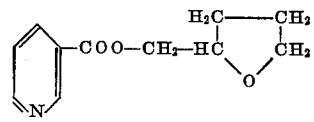

MAX HARTMANN.
EMIL MERZ.

REFERENCES CITED

The following references are of record in the file of this patent:

UNITED STATES PATENTS

| Number | Name | Date |
|---|---|---|
| 2,229,997 | Claborn | Jan. 28, 1941 |
| 2,408,020 | Hartman | Sept. 24, 1946 |
| 2,410,294 | Korten | Oct. 29, 1946 |